United States Patent [19]
Fuller

[11] Patent Number: 4,886,459
[45] Date of Patent: Dec. 12, 1989

[54] PRECISION CONTROLLED CARTESIAN DIVER

[76] Inventor: Walter D. Fuller, 14475 Strathmore La,, Apt. 807, Delray Beach, Fla. 33446

[21] Appl. No.: 217,559

[22] Filed: Jul. 11, 1988

[51] Int. Cl.$^4$ ............................................. G09B 23/06
[52] U.S. Cl. ..................................... 434/300; 273/1 L
[58] Field of Search ................. 73/444, 447, 448, 450, 73/4 R; 434/300, 302; 446/153, 154, 155, 180; 272/8 N; 273/1 L; 232/8 N

[56] References Cited

U.S. PATENT DOCUMENTS

| | | | |
|---|---|---|---|
| 1,675,522 | 7/1928 | Weidinger et al. | 272/8 N |
| 2,509,112 | 5/1950 | Seaman | 272/8 N |
| 3,077,697 | 2/1963 | Fry | 446/155 |
| 3,334,439 | 8/1967 | Lodrick | 446/155 |
| 3,661,652 | 5/1972 | Vitenbroek | 73/444 |
| 3,824,711 | 7/1974 | Lawlor et al. | 434/300 |
| 3,878,624 | 4/1975 | DeFelice | 272/8 N |
| 4,455,782 | 6/1984 | Seefluth | 446/155 |

FOREIGN PATENT DOCUMENTS 2443127 3/1976 Fed. Rep. of Germany ........ 73/444

1339622 9/1987 U.S.S.R. ............................. 434/300

Primary Examiner—Robert R. Raevis

[57] ABSTRACT

A closed fluid containing device wherein precise and reversible controlled pressure is applied to a contained fluid and to a freely enclosed, variably bouyant, pressure sensitive submersible that transits a vertical travel guide reciprocably. Variance of the controlled applied pressure varies the fluid displacement and bouyancy of the pressure sensitive submersible. Within the limiting factors of displacement of the fluid, specific gravity, density, and vertical location, the submersible will then rise, fall, or remain freely suspended. Timely direct or indirect observation of indicia related to a piston that controls the applied pressure, observation of indicia on the submersible in transit or freely suspended, and observation of indicia on the vertical travel guide provide data necessary for the calculation of values of a plurality of physical properties of fluids including fluid pressure, specific gravity, density and bouyancy, as well as a plurality of properties related to the motion of solids through fluids including velocity, acceleration, terminal velocity, drag, and viscosity.

19 Claims, 4 Drawing Sheets

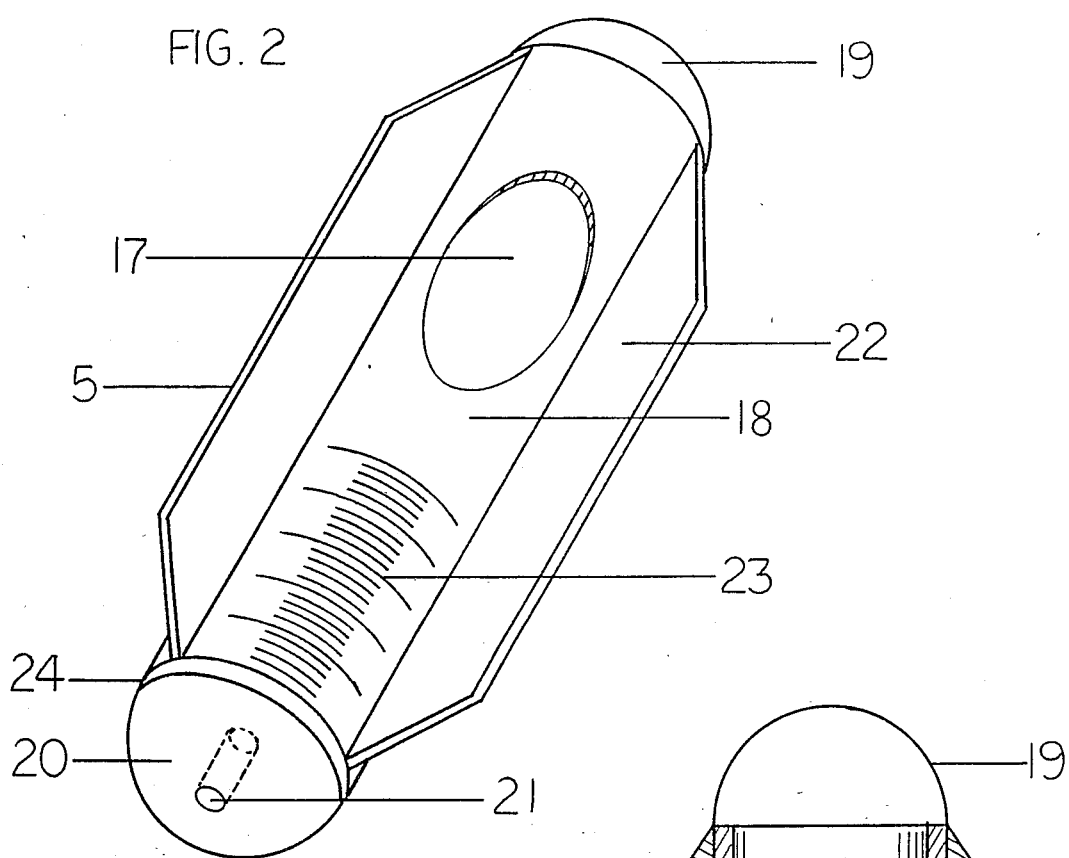
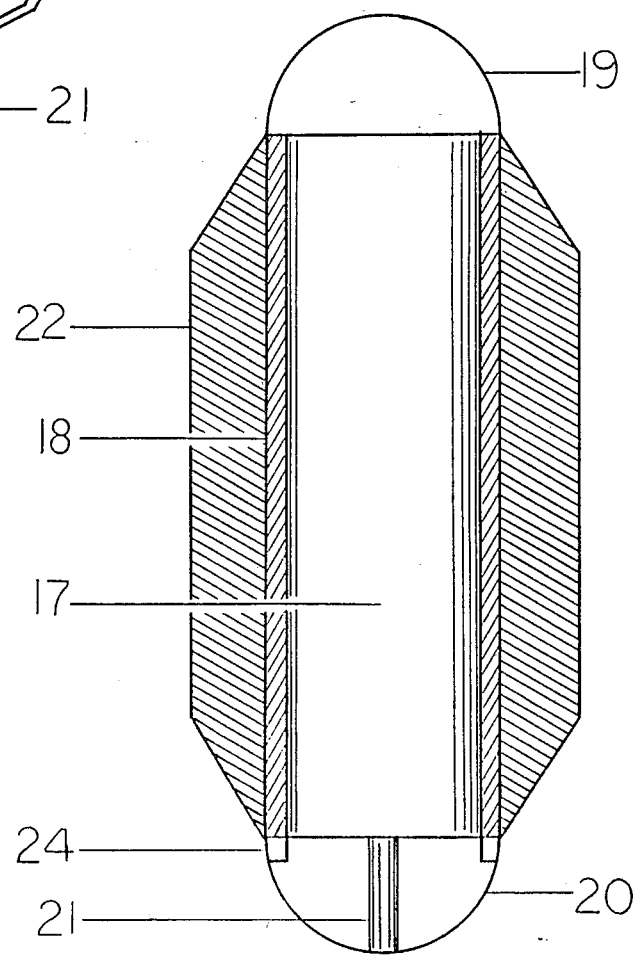

PRECISION CONTROLLED CARTESIAN DIVER

BACKGROUND OF THE INVENTION

Science teachers in many fields and at many levels demonstrate Pascal's laws related to applied pressure, Boyle's laws of gas pressure, and Archimedes' principle of bouyancy with a "Cartesian Diver". Usually, a glass "Diver" is placed in a glass cylinder and hand pressure is applied directly to the cylinder or a diaphram causing the diver to sink. The demonstration in this form, while entertaining, does not provide for accurate control or measurement of the forces or motions involved.

The U.S. Patent of Defelice, U.S. Pat. No. 3,878,624, discloses a cylindrical tube convertible for a cartesian diver demonstration. First, precision control is sacrificed by using a flexible tube and flexible bulb for varying air pressure. Secondly, no provision is made for decreasing ambient pressure. Thirdly, no provision for accurate measurements of a plurality physical properties is made. The invention presently disclosed overcomes these limitations.

This invention provides for precise, controllable and reversible pressure. It also provides for indicia on the means for applying pressure and the vertical means within which the "Diver" travels, as well as indicia on the "Diver". By these means and by timely observation, data is easily obtained related to pressure, displacement, specific gravity, density, "Crush Depth", velocity, increasing acceleration, terminal velocity, viscosity, and drag.

Problems with current laboratory measurements of relatively constant free fall acceleration are that such measurements are indirect, costly, almost instantaneous, and therefor, accurate measurements are difficult to obtain. Further, terminal velocity is seldom obtained.

This invention provides an experimental situation wherein the acceleration of the diver due to gravity and changing bouyancy as the diver transits a vertical guide is in slow enough rates that direct observation and manual timing is possible. Further, terminal velocities can be easily obtained. Changing rates of acceleration, similar to rocket acceleration, in contrast to free fall constant acceleration due to gravity can also be demonstrated with this invention.

In addition, the transparent construction of the vertical guide member permits electronic timing with radiation path interruption. Capacitive or magnetic switching is also possible with appropriate "Divers" hereinafter called submersibles. Radiation path interruption and capacitive and magnetic switching for timing purposes are accomplished with commercially available adjunctive sensing devices that are not an integral part of this invention. Another advantage of the invention is that the measurement of the motions of submersibles of varying shapes as they travel through liquids can be conveniently measured.

Further, the invention can be used as a game of skill in the effort to "Stop" the submersible in motionless suspension at a particular point in its vertical transit. This is an extremely difficult, if not impossible, task.

Minor variations in embodiments including size, shape, and means of observation make the invention useful for student, teacher, engineer, or researcher.

BRIEF SUMMARY OF THE INVENTION

This invention is a device to measure and to demonstrate a plurality of physical properties of fluids and also a plurality of motions of solids through fluids.

A precision controlled piston in contact with an enclosed fluid is displaced in a cylinder by rotating a dial on a threaded shaft. The piston, thusly displaced, displaces the enclosed fluid throughout the system and thereby compresses gases in the floatation chamber of a freely enclosed, vertically reciprocable, indexed submersible device. The resultant change in volume of the gases changes the bouyancy of the submersible device. The submersible device will then rise or fall or remain in motionless suspension, depending on the location of the submersible in an elongated guide means and the balance or imbalance of the forces of gravity and bouyancy.

A transparent base member provides support for the applied pressure means and the elongated indexed guide means. Further, the base member contains a substantial portion of the enclosed fluid thereby lowering the center of gravity and thereby increasing the stable equilibrium of the system while also providing for the transmission of fluid pressure from the controlled applied pressure means to the elongated guide means enclosing the submersible means.

The elongated guide means is transparent thereby providing for direct observation of changes in fluid displacement within the submersible's floatation chamber and the motions of the submersible enclosed within the vertical guide. In a preferred embodiment, the length of the elongated guide means permits the submersible to accelerate to the velocity at which drag forces balance the force of gravity whereby the enclosed submersible reaches terminal velocity. Further, the preferred elongation, cooperatively with observations of the change in volume of the gases in the submersible's floatation chamber when observed at different locations within the vertical guide, demonstrates measurably the change in fluid pressure with depth that is caused by the weight of the water column above the submersible.

The elongated guide means in cooperation with a quick pressure release means demonstrates "Crush Depth" when pressure from the water column above the submersible, in addition to ambient air pressure, compresses gases in the submersible's floatation chamber to the extent that the resultant bouyancy does not balance gravity and the submersible continues sinking without applied pressure.

The elongated guide means is threaded at the top to sealingly engage a threaded cap removable for filling or emptying of fluids and for replacement of preferred submersibles. The threaded cap has an aperture to receive excessive pressure relief means and when said relief means is removed, said aperture provides for manual quick release of applied pressure. In a preferred embodiment, said pressure relief means is a resilient plug, press fitted into said aperture.

The submersible means may have a transparent floatation chamber with indicia for direct reading of gas volume and, conversly, data applicable to the calculation of fluid displacement and, when the submersible means is in apparently free motionless subpension, density.

Collection of data related to the various motions of the submersible means may be made directly by observation of the position of the submersible means with reference to indicia on the vertical guide means through the transparent elongated guide means. An opaque stripe on the submersible permits automatic measurement of motion by radiation path interruption. Appropriate implants in the submersible means permits the automatic measurement of motion through electrostatic and magnetic switching.

Variations of shapes and sizes of the submersibles provides for measurement of related variation of drag forces and, similarly, viscosity.

Indicia on the dial, the elongated guide means, and the submersible means cooperatively provide data related to physical laws of gas pressure, fluid pressure, specific gravity, density, motion of solids through fluids, varying acceleration, and the like.

BRIEF DESCRIPTION OF DRAWINGS

FIG. 2 is a perspective view of an embodiment of a variably bouyant submersible device to be enclosed as shown in FIG. 1.

FIG. 3 is a longitudinal sectional view of the submersible shown in FIG. 2.

FIG. 4 is a longitudinal sectional view of an embodiment of a submersible as applied to variation of drag, viscosity, and the like.

DESCRIPTION OF THE PREFERRED EMBODIMENTS

Figure 1:
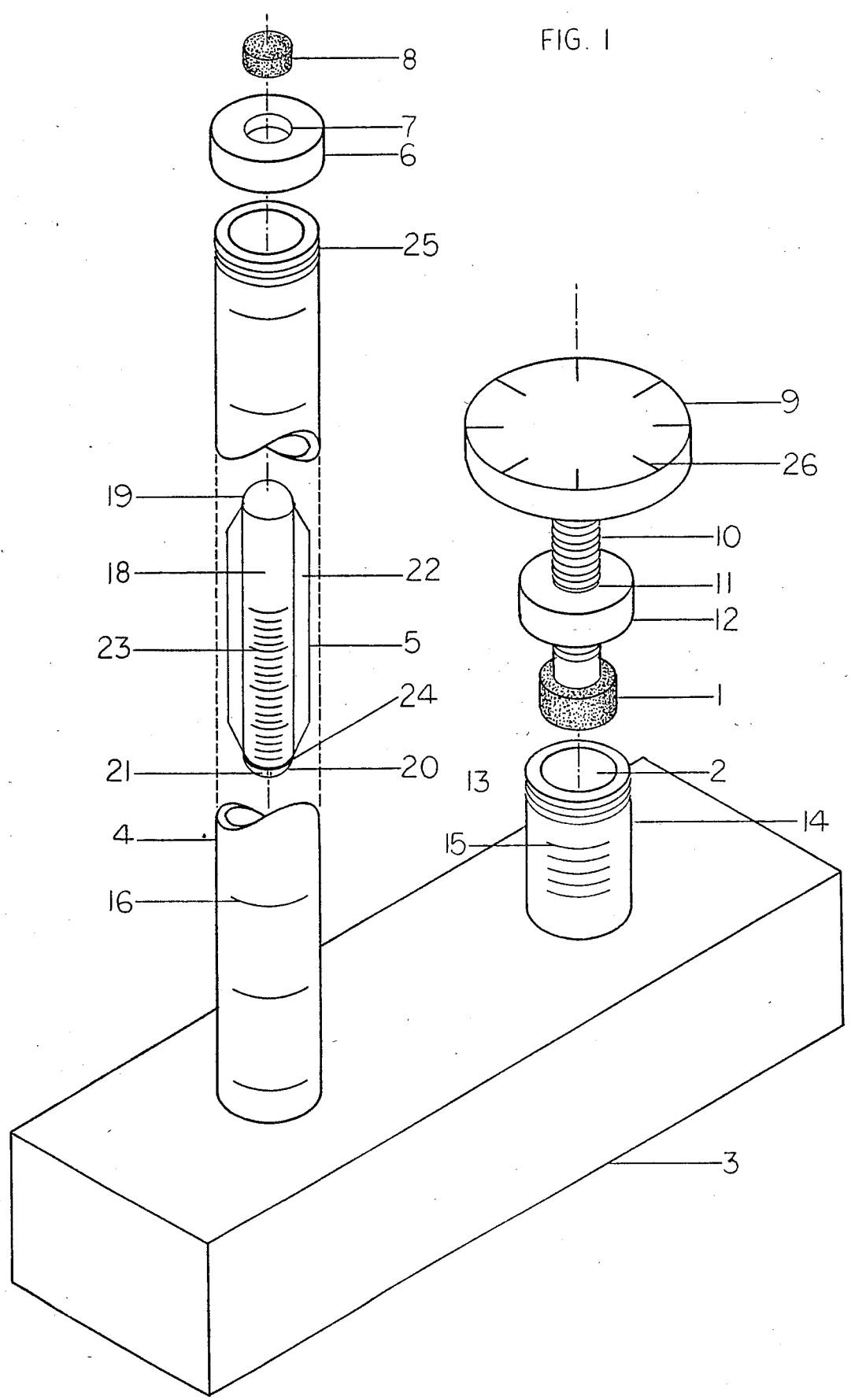
FIG. 1 is a partially sectioned perspective view of a preferred embodiment of a device in accordance with the invention shown in partial disassembly.

Referring to FIG. 1, the device consists of piston 1 moveable in a chamber 2 in response to the rotation of the dial 9 thereby displacing enclosed fluids through the chamber 2, the support base 3, an elongated vertical guide 4 and a freely enclosed submersible 5. The vertical guide 4 is sealed with threads 25 and a threaded cap 6; said cap 6 having an aperture 7 to sealably receive an excess pressure relief plug 8.

Calculation of the displacement of the piston 1 may be made by observing indicia 26 during rotation of a dial 9 attached to a threated shaft 10 cooperatively with thread displacement per revolution through a threaded aperture 11 in a threaded cap 12 on the terminal threads 13 on the cylinder 14 forming chamber 2. The calculation of linear displacement of the piston 1 is made by multiplying the pitch of the threads 13 by the number of turns and partial turns of the dial 9. Indicia 26 on the dial 9 provide a reference for observation of numerical data related to the amount of rotation by comparing the indicia 26 to any convenient reference point as the dial 9 is turned. The mathematical product of the linear displacement of the piston 1 and the circular area of the piston 1 gives a calculated value for the volume of fluid displacement.

Direct observation of displacement of piston 1 may be made cooperatively with indicia 15 on the cylinder 14. Indicia 16 on the transparent elongated guide 4 provide a means for measuring distance intervals traveled by the submersible 5. The submersible 5 is timed as it passes said indicia 16 during its transit of the elongated vertical guide 4 thereby providing a series of time intervals related to the motion of the submersible 5. The distance and time data so obtained may be converted to velocity and acceleration quantities using conventional physical relationships. In use, the operator rotates the dial 9 until submersible 5 appears to begin its transit of the vertical guide 4 then, using a commercially available timing device, such as a stopwatch, in the "lap timing" mode, the operator records the interval of time required for the submersible 5, to pass each indicium 16 on the vertical guide 4. A preffered embodiment of the submersible 5 has a transverse stripe 24 for convenience in timing as to when the stripe 24 and each indicium 16 are in conjunction.

Referring to FIG. 2, a preferred embodiment of a submersible 5, a transparent body 18 encloses a floatation chamber 17. The upward terminus of the submersible 5 is sealed with a cap 19. The cap 20 on the downward terminus has an aperture 21 to permit entrance and exit of displaced fluid thereby affecting bouyancy as related to pressure. Pins 22 radiate from the body 18 to keep the submersible in relatively vertical alignment with the elongated guide 4. Indicia 23 on the body 18 may provide direct measurement of the variance of volume of gases with the floatation chamber 17 and cooperatively with direct measurement of appropriate dimensions of the solid parts of the submersible 5, provide all data necessary for the calculation of a plurality of physical properties. A band 24 implanted or applied as preferred in the downward cap 20 provides for radiation path interruption, magnetic, and electrostatic switching used in motion property calculations.

Figure 4:
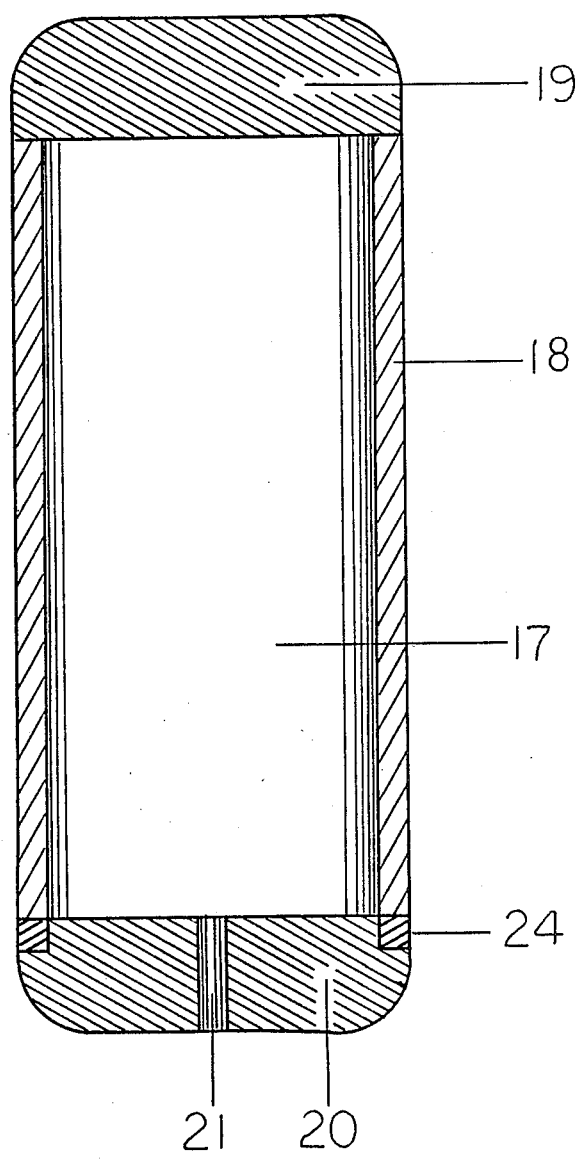

Referring to FIG. 4, an embodiment of a submersible without fins with a diameter 27 approaching the diameter of the vertical guide 4 shown in FIG. 1 is shown.

Figure 5:
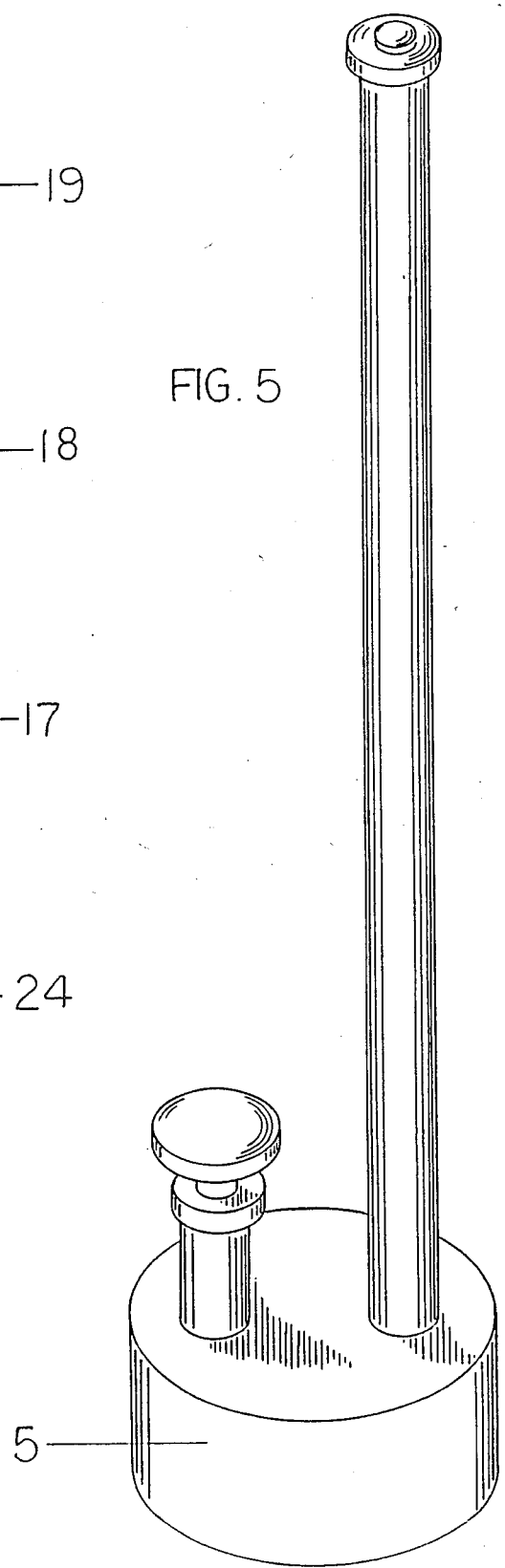
FIG. 5 is a perspective view of an alternate embodiment of the invention.

Referring to FIG. 5, an embodiment of the device with a cylindrical base 3 is shown.

Figure 6:
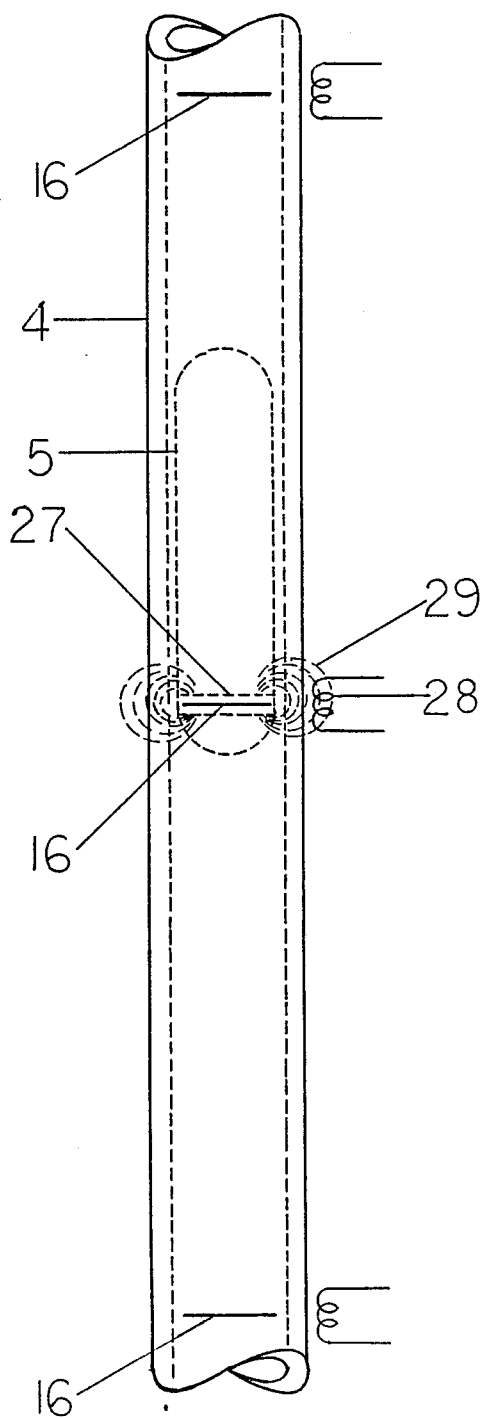
FIG. 6 is a fragmentary front view of an embodiment of the vertical guide means and the submersible means showing adjunct sensors sensitive to a moving magnetic field.

Referring to FIG. 6, a magnetic band 27 on the submersible 5 is shown in conjunction with an indicium 16 and a related sensor 28. The magnetic field 29 of the magnetic band 27 is sensed by each sensor 28 as the submersible 5 transits the vertical guide 4.

Figure 7:
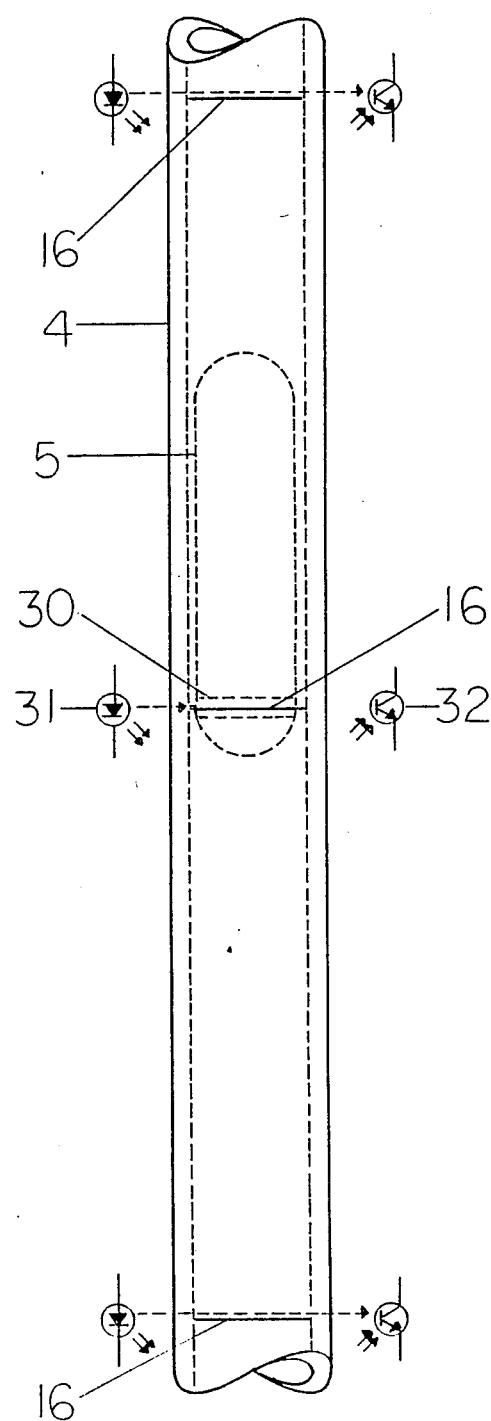
FIG. 7 is a fragmentary front view of an embodiment of the vertical guide means showing adjunct sensors sensitive to radiation path interruption.

Referring to FIG. 7, an opaque stripe 30 on the submersible 5 is shown in conjunction with an indicium 16. The opaque stripe 30 interrupts the radiation path from an adjunct radiation source 31 and thus the radiation sensors 32 senses the immediate presence of the submersible 5 as it passes each sensor 32 as the submersible 5 transits the vertical guide 4.

I claim:

1. A closely fluid containing device comprising an indexed fluid displacement means, a transparent, elongated, indexed vertical guide means freely enclosing a variably buoyant, indexed, pressure sensitive submersible means that transits said vertical guide means reciprocably in response to precisely controlled, measurable, fluid displacement variations, and a base support means that provides support to and transmits pressure and fluid between said indexed fluid displacement means and said elongated, indexed, vertical guide means, said base support means enclosing a portion of the total enclosed fluid.

2. A closed fluid containing device as described in claim 1, wherein the indexed fluid displacement means comprises an indexed member that cooperatively with a connecting shaft and piston, and a transparent, indexed, piston enclosing cylinder, displaces said piston a calculable and observable distance and thereby displaces a calculable volume of fluid in contact with said piston whereby said indexed fluid displacement means measurable controls fluid displacement and applied pressure throughout the device.

3. The indexed fluid displacement means of claim 2, wherein the indexed member comprises as indexed dial, said indicia calibrated to indicate the number of turns and partial turns of said dial when observed in relation to any convenient reference point as said dial is rotated.

4. The indexed fluid displacement means of claim 2, wherein the connecting shaft member comprises a threaded shaft, said threads having a given pitch, that displaces said shaft a calculable linear distance upon rotation of said shaft member, said distance being the product of the number of turns and the pitch of said threads.

5. A closed fluid containing device as described in claim 1 wherein the transparent, elongated, indexed, vertical guide means of claim 1 comprises a transparent, elongated, indexed, vertical guide member freely enclosing the variably bouyant, indexed, pressure sensitive submersible means and a portion of the fluid of claim 1.

6. The transparent, elongated, indexed, vertical guide means of claim 1 wherein said elongation is of sufficient length to enclose a column of fluid of sufficient height whereby the freely enclosed, indexed, variably buoyant submersible means descending or ascending said vertical guide means, may accelerate to the velocity whereby increasing drag forces of the fluid, as said variably buoyant submersible means transits said vertical guide means, equal the force of gravity and thereby said submersible means reaches terminal velocity.

7. The transparent, elongated, indexed, vertical guide means of claim 1, wherein said elongated guide means encloses a fluid column of sufficient height whereby the pressure of said fluid above the freely enclosed, variably buoyant submersible means compresses gases in the floatation chamber of said submersible means as said submersible means transits said vertical guide means to the extent that the overall density of said submersible means and enclosed gases is greater than said enclosed fluid and thereby said submersible means sinks independently of applied pressure.

8. A closed fluid containing device, as described in claim 1, wherein the base support means comprises a transparent fluid containing base, supporting in stable equilibrium, the indexed fluid displacement means and the elongated, indexed, vertical guide means of claim 1.

9. The transparent, elongated, indexed, vertical guide means, of claim 1 comprising a sealed upper terminus aperture, said aperture being press fitted with a resilient plug, removal of said plug providing as opening suitable for independent, intentional, manual, quick release of pressure applied by the indexed fluid displacement means of claim 1.

10. The variably bouyant, indexed, pressure sensitive submersible means of claim 1, wherein an opaque transverse stripe encircles the body, enabling direct, precise, visual observation and measurement of the motions of said submersible as said submersible transits the elongated, transparent, vertical guide of claim 1, said measurements made as said opaque stripe is in conjunction with each indicium of the transparent, elongated, indexed, vertical guide means of claim 1.

11. The variably bouyant, indexed, pressure sensitive submersible means of claim 1 wherein a magnetic implant encircles the body of said submersible, thereby enabling the use of adjunct sensors sensitive to magnetic fields for the purpose of automatic measurement of motion, said measurement made as said magnetic field activates said adjunct sensors as said submersible transits the transparent, elongated, vertical guide of claim 1.

12. The variably bouyant, indexed, pressure sensitive submersible means of claim 1, comprising a transparent body that encloses a floatation chamber, said floatation chamber containing gases susceptible to changes in volume with changes in pressure of fluids in contact with said gases thereby varying buoyancy, said contact achieved through an aperture in the lower terminus of said body, indicia on said body providing references for precise direct observation and measurement of the volume of gases within said floatation chamber, further comprising precise motion measurement enabling means, said motion measurement made as said submersible transits the transparent, elongated, indexed, vertical guide means of claim 1, and said precise motion measurement enabling means are in conjunction with each indicium on the body of said transparent, elongated, indexed, vertical guide.

13. The variably buoyant, indexed, pressure sensitive submersible means of claim 12, wherein the precise motion measurement enabling means comprises an opaque stripe encircling the body of said submersible means enabling precise motion measurement by adjunct sensors activated by radiation path interruption as said opaque stripe is in conjunction with said adjunct sensors as said submersible means transits the transprent, indexed, elongated, vertical guide means of claim 13.

14. The variably buoyant, indexed, pressure sensitive submersible means of claim 12, wherein indicia on the transparent body serve as references to provide for direct measurement of enclosed gas volume and conversely, displacement.

15. A closed fluid containing device, as described in claim 1 wherein the indexed fluid displacement means comprises an indexed dial rotatable axially in cooperation with a threaded shaft member and a piston member, rotation thereof displacing said piston member in a cylinder member a finite distance, said distance calculable by reference to the pitch of the threads on said threaded shaft and the number of turns and partial turns as indicted by said dial.

16. A closed fluid containing device, as described in claim 1 wherein said indexed fluid displacement means comprises an indexed dial rotatable axially in cooperation with a threaded shaft member and a piston member, said rotation thereby displacing said piston member in an indexed cylinder member a finite distance, said distance measurable by observation of the piston displacement in relation to indicia on said indexed cylinder member.

17. The transparent, elongated, indexed, vertical guide means of claim 1 wherein the upper terminus is sealed with a cap threadably adapted to the vertical guide terminus to provide for convenient filling and emptying of fluids and the replacement of the submersible means of claim 1.

18. The transparent, elongated, indexed, vertical guide means of claim 1 wherein the upper terminus of said guide is sealed with a cap threadably adapted to said upper terminus, said cap having an aperture pressure fitted with a resilient plug, said plug removable under excessive pressure.

19. The transparent elongated, indexed, vertical guide means of claim 1 wherein the upper terminus of said guide is sealed with a cap threadably adapted to said upper terminus, said cap having an aperture press fitted with a resilient plug, said plug removable for convenience in instant manual release of applied pressure, in contrast to reduction of pressure through operation of the indexed fluid displacement means of claim 1.

* * * * *